(12) United States Patent
Lee

(10) Patent No.: US 10,664,458 B2
(45) Date of Patent: May 26, 2020

(54) DATABASE REBALANCING METHOD

(71) Applicant: SAMSUNG SDS CO., LTD., Seoul (KR)

(72) Inventor: Joo Yeong Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 268 days.

(21) Appl. No.: 15/794,997

(22) Filed: Oct. 26, 2017

(65) Prior Publication Data

US 2018/0121474 A1 May 3, 2018

(30) Foreign Application Priority Data

Oct. 27, 2016 (KR) .................. 10-2016-0140885

(51) Int. Cl.
*G06F 16/00* (2019.01)
*G06F 16/215* (2019.01)
*G06F 16/27* (2019.01)
*G06F 16/23* (2019.01)
*G06F 16/21* (2019.01)
*G06F 17/00* (2019.01)

(52) U.S. Cl.
CPC .......... *G06F 16/215* (2019.01); *G06F 16/21* (2019.01); *G06F 16/2365* (2019.01); *G06F 16/27* (2019.01); *G06F 16/278* (2019.01)

(58) Field of Classification Search
None
See application file for complete search history.

(56) References Cited

U.S. PATENT DOCUMENTS

| | | | | |
|---|---|---|---|---|
| 6,070,191 A * | 5/2000 | Narendran | ............. | G06F 9/505 709/217 |
| 8,307,014 B2 | 11/2012 | Mehrotra et al. | | |
| 8,595,192 B1 * | 11/2013 | Manmohan | ............. | G06F 16/21 707/678 |
| 8,903,878 B2 * | 12/2014 | Kihara | ................. | G06F 3/0611 707/758 |
| 9,378,067 B1 * | 6/2016 | Agarwala | ............. | G06F 9/5088 |

(Continued)

*Primary Examiner* — Polina G Peach
(74) *Attorney, Agent, or Firm* — Sughrue Mion, PLLC

(57) ABSTRACT

Provided are a database rebalancing method including three or more database (DB) nodes, the method comprises configuring a first node set including two or more DB nodes from among the three or more DB nodes included in the storage system, performing a first partial rebalancing between DB nodes of the first node set, during the first partial rebalancing, performing a first partial rebalancing cover step in which DB nodes excluded from the first node set perform a normal operation, configuring a second node set including two or more DB nodes from among the three or more DB nodes included in the storage system, performing a second partial rebalancing between DB nodes of the second node set, the second partial rebalancing being performed after completion of the first partial rebalancing and during execution of the second partial rebalancing, performing a second partial rebalancing cover step in DB nodes excluded from the second node set perform a normal operation, wherein at least one DB node included in the first node set is not included in the second node set, or at least one DB node included in the second node set is not included in the first node set.

13 Claims, 10 Drawing Sheets

(56) References Cited

U.S. PATENT DOCUMENTS

| | | | |
|---|---|---|---|
| 10,102,267 B2* | 10/2018 | Inoue | G06F 16/278 |
| 10,291,707 B1* | 5/2019 | Lin | H04L 67/1097 |
| 2006/0184565 A1* | 8/2006 | Nishikawa | G06F 3/067 |
| 2008/0065704 A1* | 3/2008 | MacCormick | G06F 16/1844 |
| 2009/0064164 A1* | 3/2009 | Bose | G06F 1/206 |
| | | | 718/105 |
| 2010/0186016 A1* | 7/2010 | Chan | G06F 9/4881 |
| | | | 718/103 |
| 2011/0138148 A1* | 6/2011 | Friedman | G06F 3/0613 |
| | | | 711/173 |
| 2012/0278293 A1* | 11/2012 | Bulkowski | G06F 16/27 |
| | | | 707/703 |
| 2012/0290714 A1* | 11/2012 | Cohen | G06F 11/00 |
| | | | 709/224 |
| 2014/0164329 A1* | 6/2014 | Guo | G06F 11/2094 |
| | | | 707/634 |
| 2015/0106578 A1* | 4/2015 | Warfield | G06F 3/0613 |
| | | | 711/158 |
| 2015/0161016 A1* | 6/2015 | Bulkowski | G06F 11/183 |
| | | | 714/4.2 |
| 2015/0237121 A1* | 8/2015 | Nigam | H04L 67/1008 |
| | | | 709/204 |
| 2016/0055225 A1* | 2/2016 | Xu | G06F 16/27 |
| | | | 707/624 |
| 2016/0142475 A1* | 5/2016 | Kathuria | H04L 67/1008 |
| | | | 709/203 |
| 2016/0323377 A1* | 11/2016 | Einkauf | H04L 67/1076 |
| 2018/0024853 A1* | 1/2018 | Warfield | G06F 9/45558 |
| | | | 718/1 |

* cited by examiner

[FIG. 1]
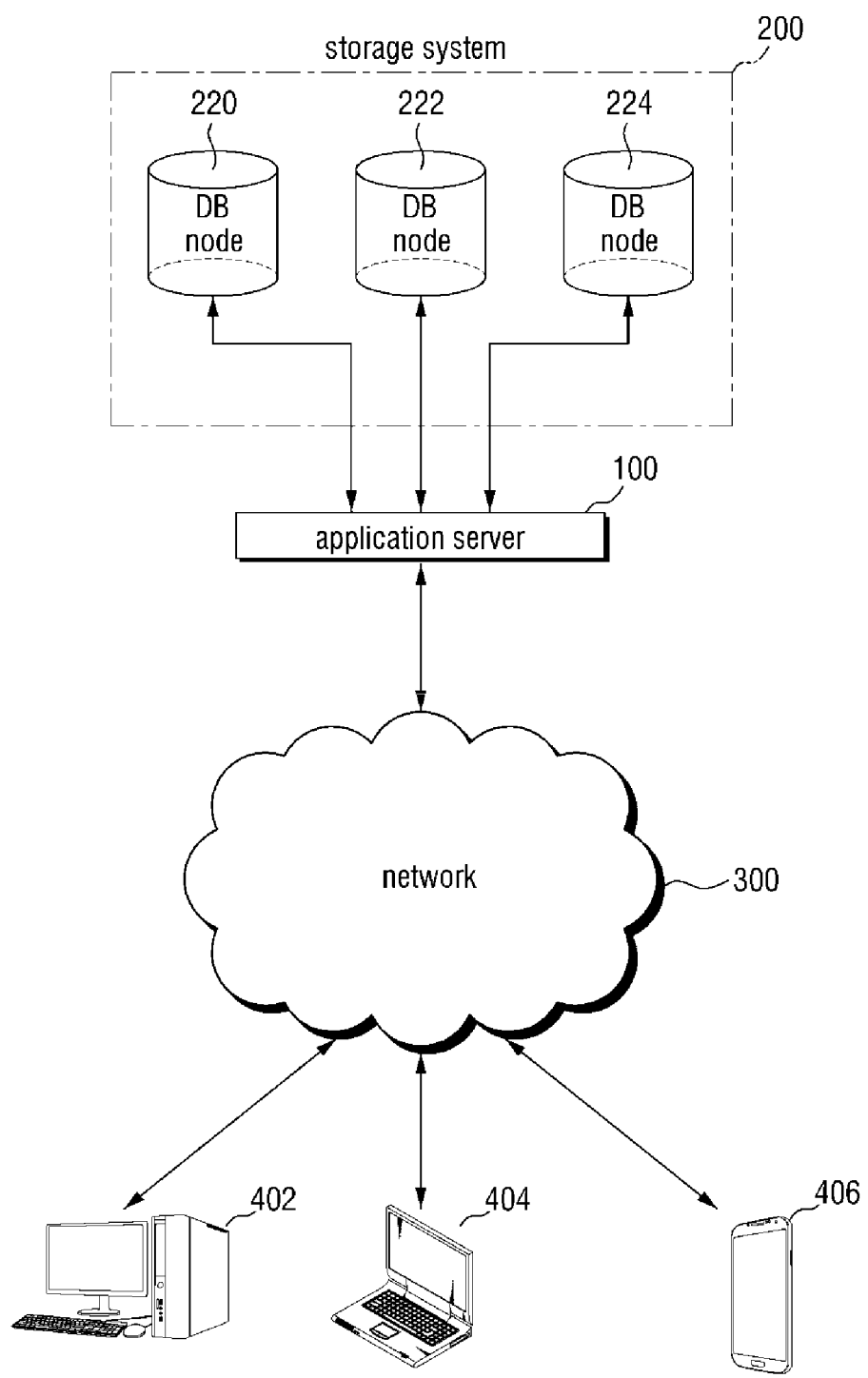

[FIG. 2]
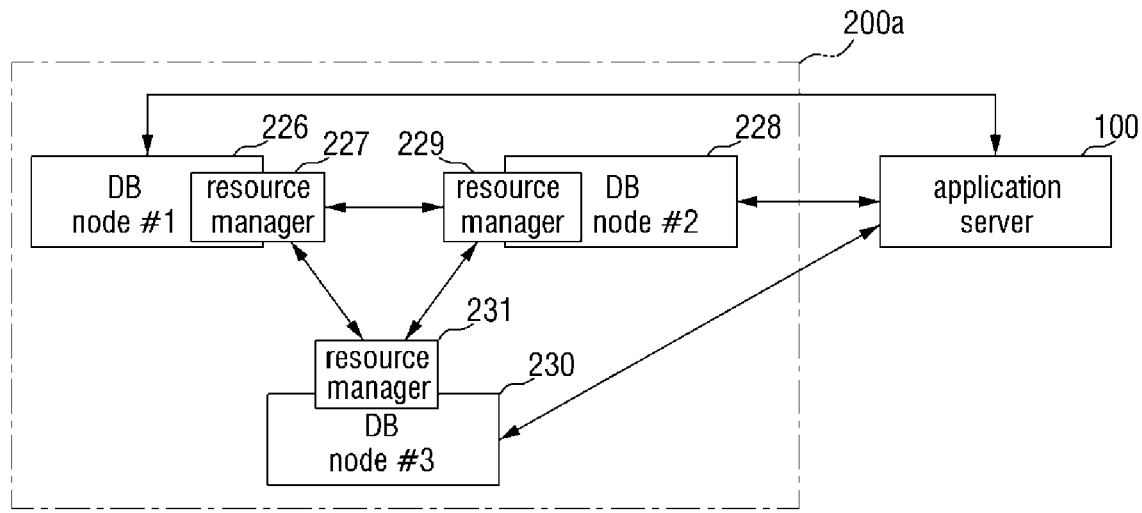
[FIG. 3]
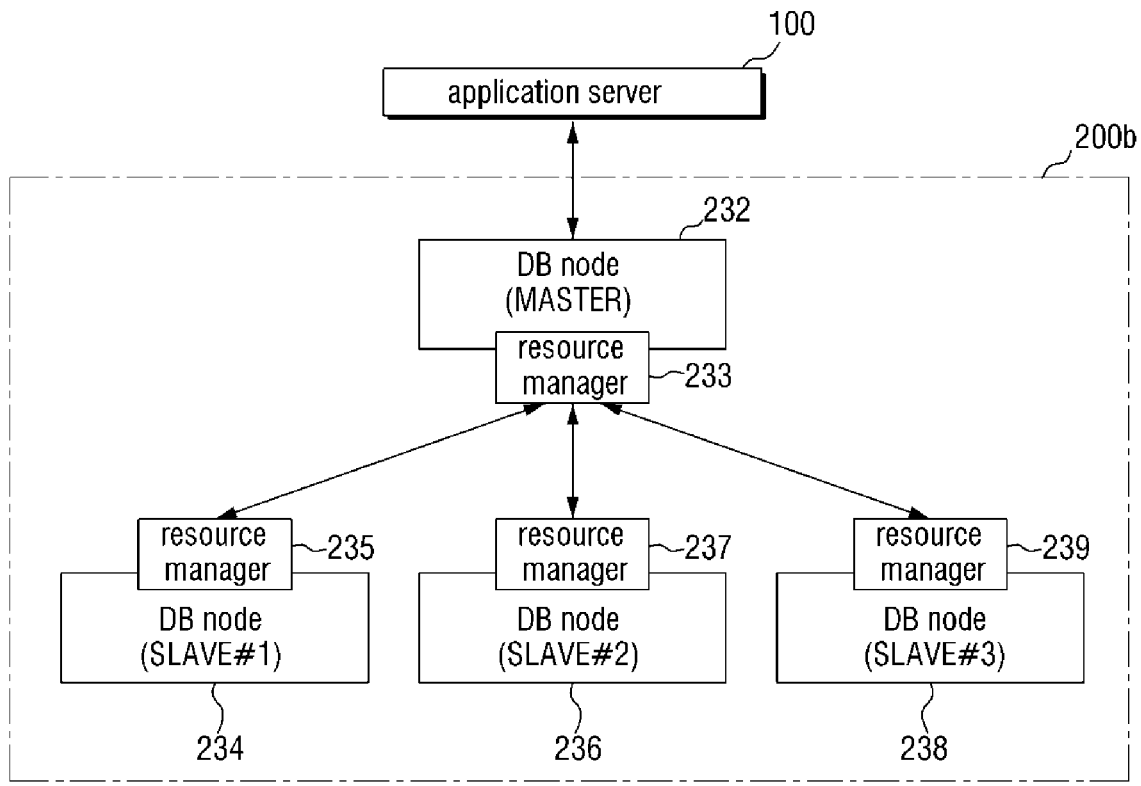

[FIG. 4A]
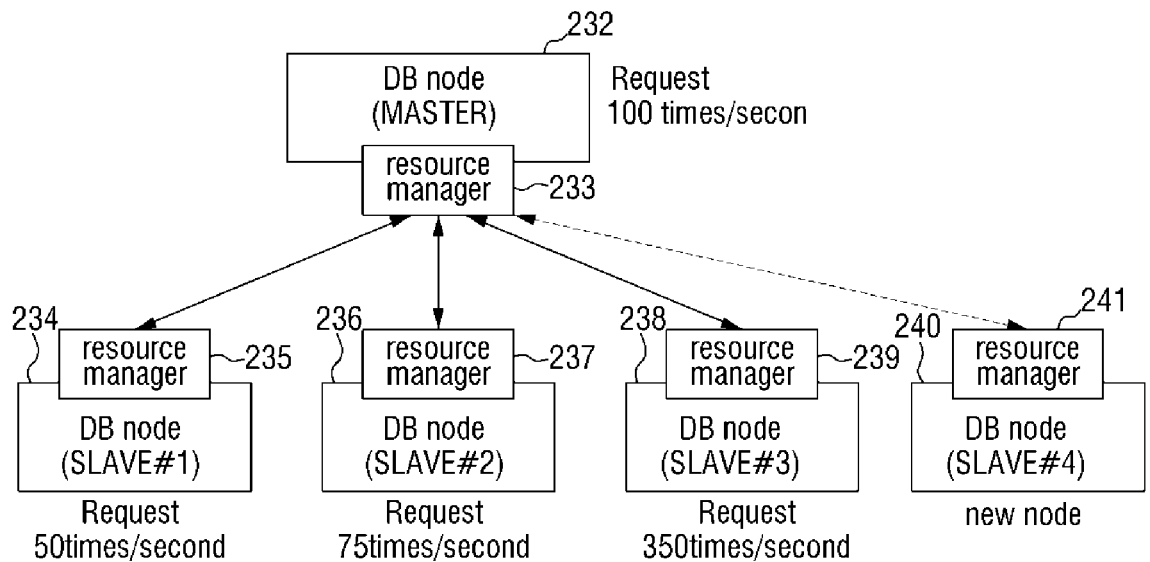
| time | rebalancing participation node | normal-serviceable DB node |
|---|---|---|
| 1 | DB node (SLAVE#3) → DB node (SLAVE#4) | (SLAVE#1,2 MASTER) |
| 2 | DB node (MASTER) → DB node (SLAVE#4) | (SLAVE#1,2,3) |
| 3 | DB node (SLAVE#2) → DB node (SLAVE#4) | (SLAVE#1,3 MASTER) |
| 4 | DB node (SLAVE#1) → DB node (SLAVE#4) | (SLAVE#2,3 MASTER) |
| rebalancing completion | | (SLAVE#1,2,3,4 MASTER) |

[FIG. 4B]

| time | rebalancing participation node | | connection priority adjustment |
|---|---|---|---|
| 1 | DB node (SLAVE#3) | → DB node (SLAVE#4) | SLAVE#3 adjust to lowermost level |
| 2 | DB node (MASTER) | → DB node (SLAVE#4) | MASTER adjust to lowermost level |
| 3 | DB node (SLAVE#2) | → DB node (SLAVE#4) | SLAVE#2 adjust to lowermost level |
| 4 | DB node (SLAVE#1) | → DB node (SLAVE#4) | SLAVE#1 adjust to lowermost level |
| rebalancing completion | | | slave #4 set priority |

[FIG. 4C]

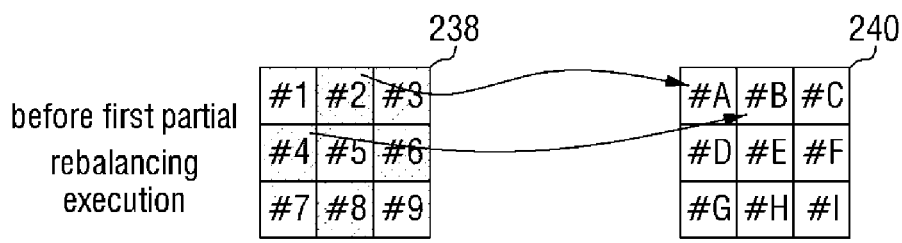

before first partial rebalancing execution

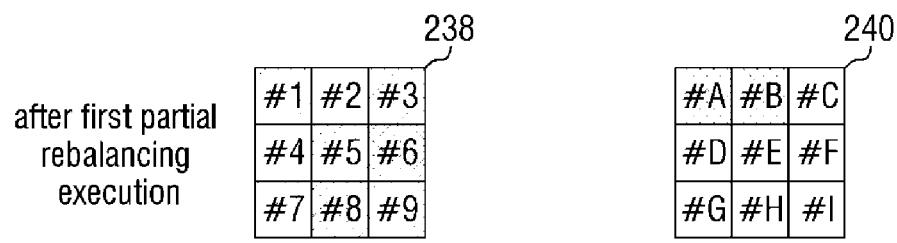

after first partial rebalancing execution remarks:  HOT PARTITION   USED PARTITION   EMPTY PARTITION

[FIG. 4D]
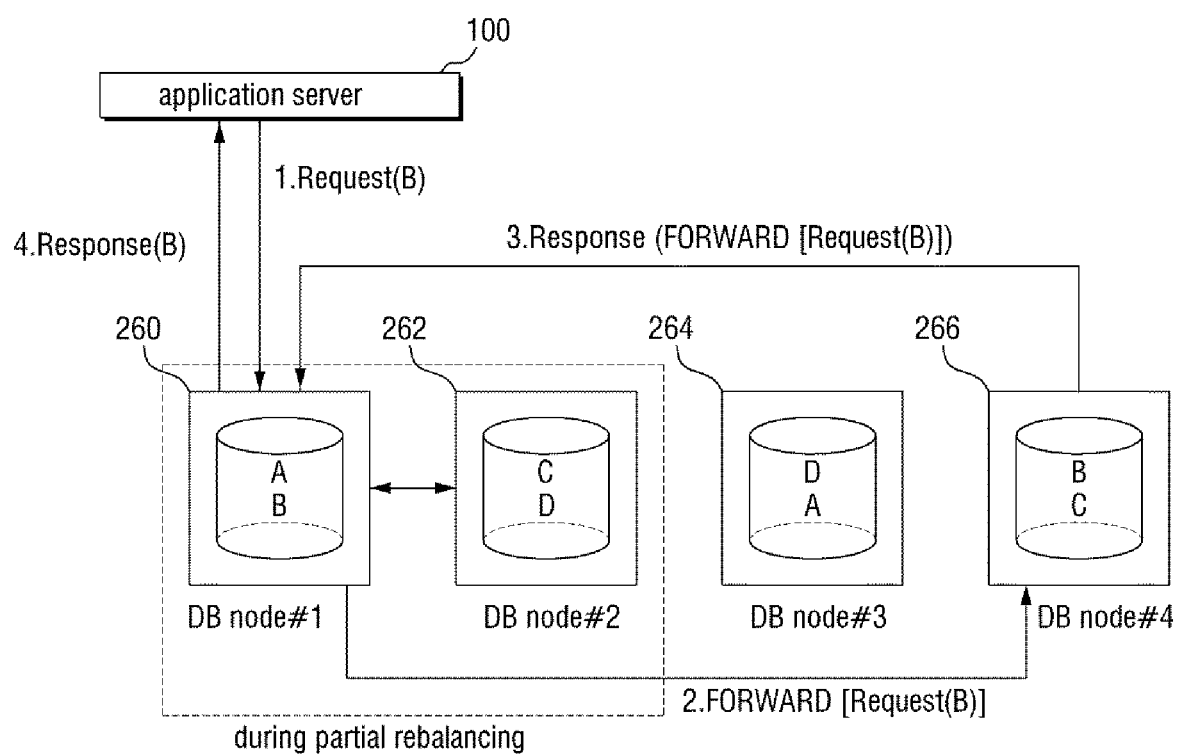

[FIG. 5]
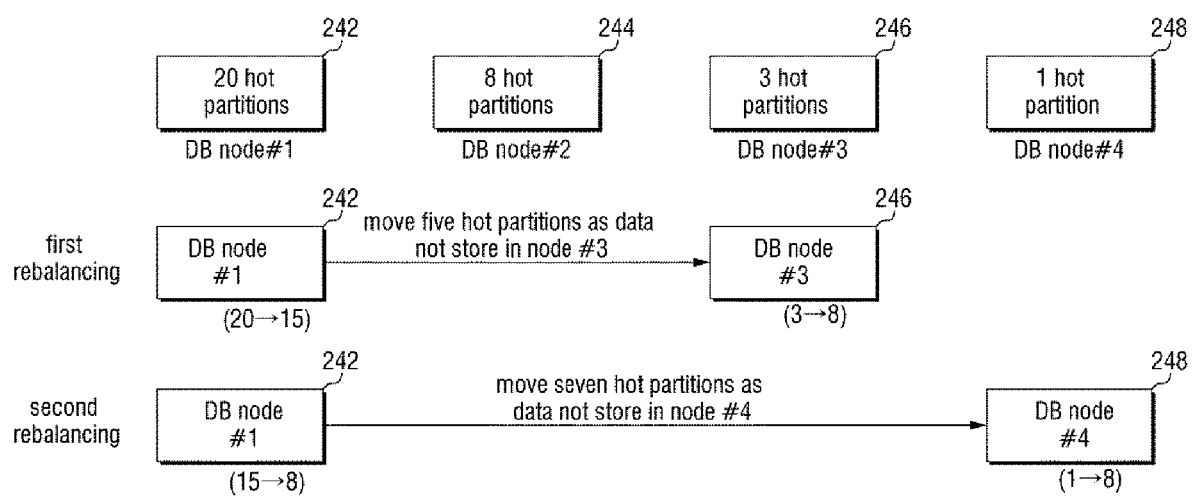

[FIG. 6]
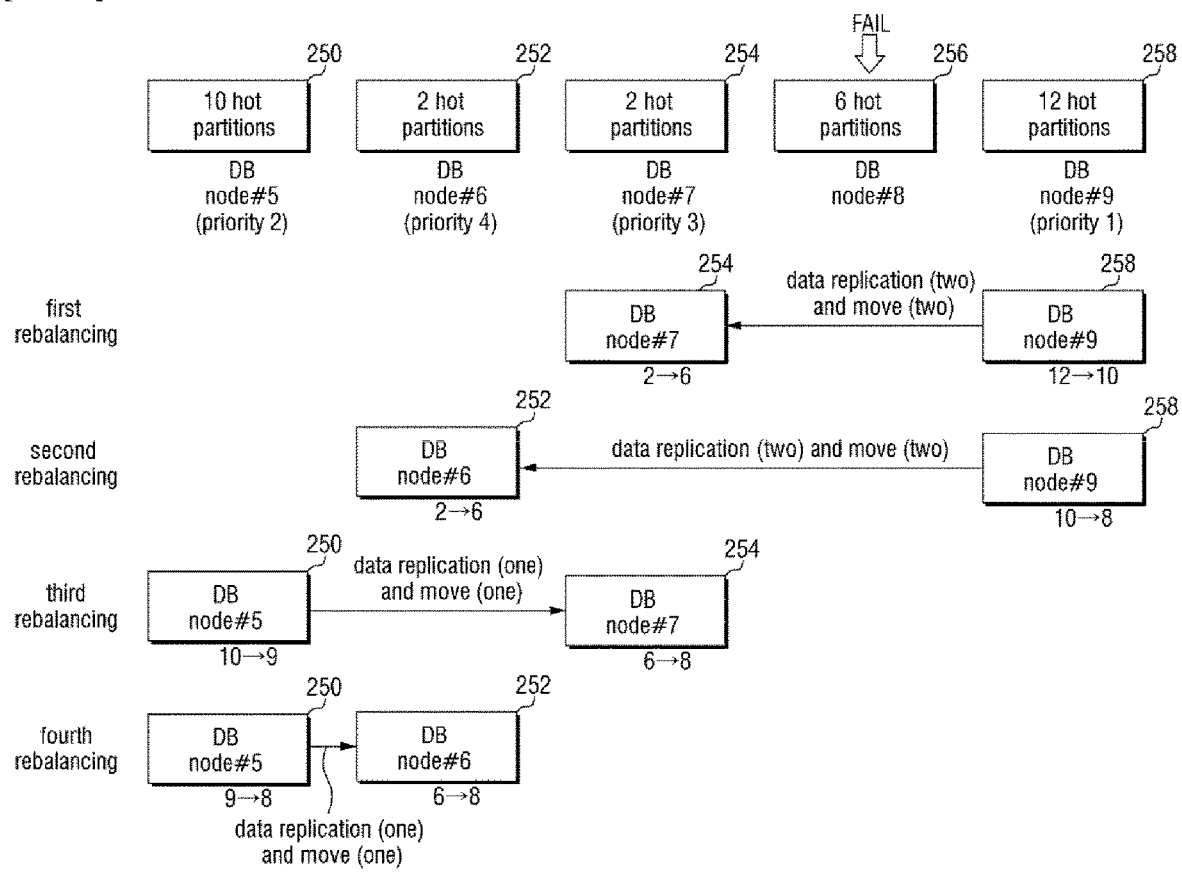

[FIG. 7]
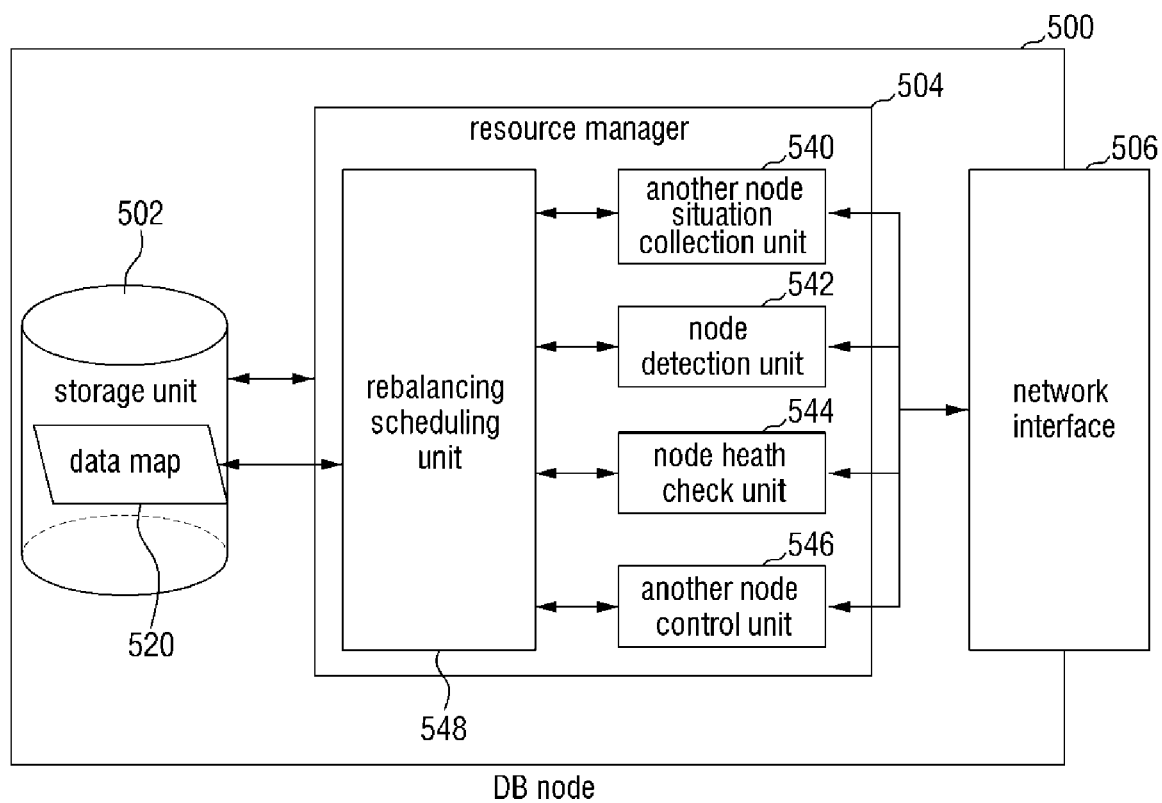

[FIG. 8]
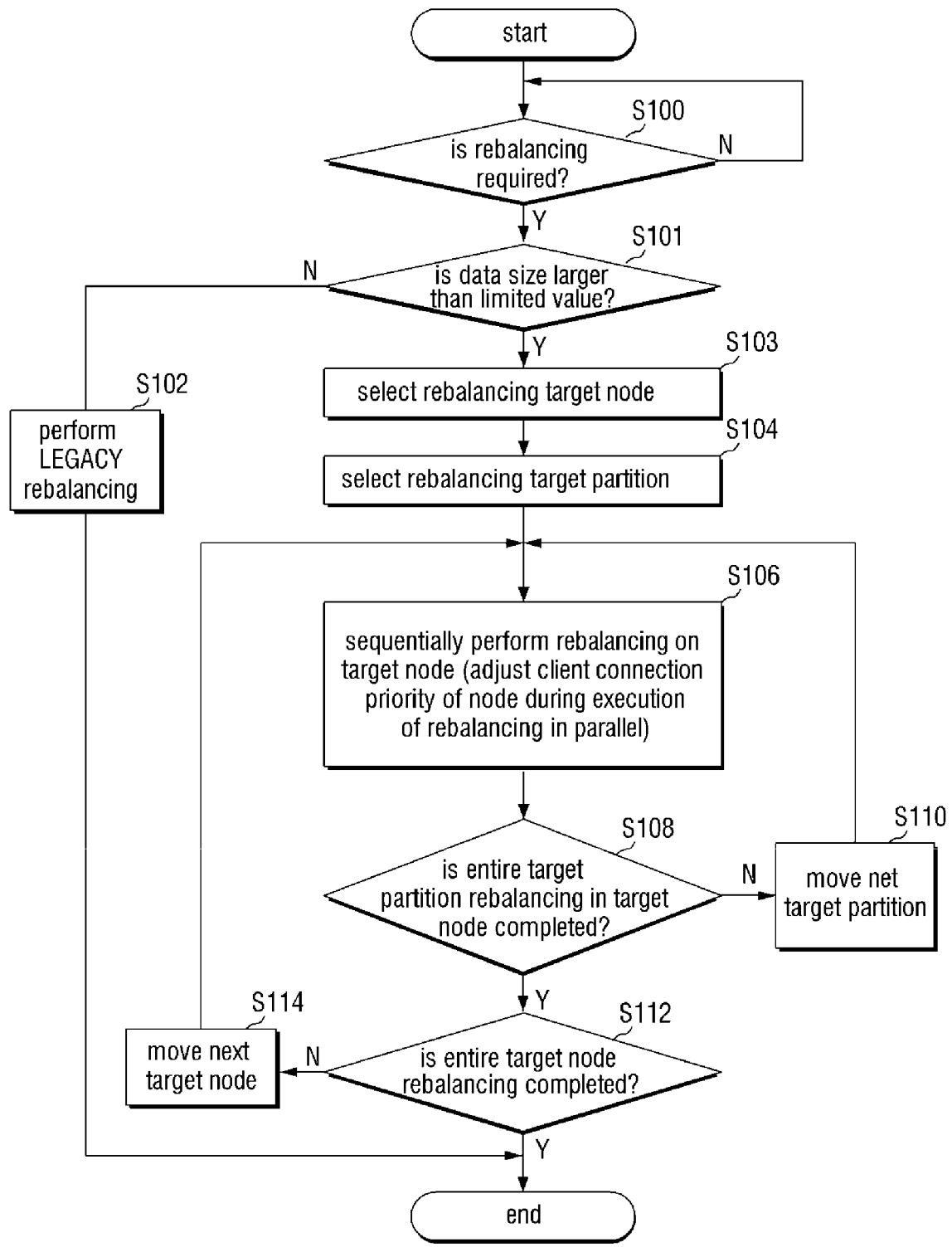

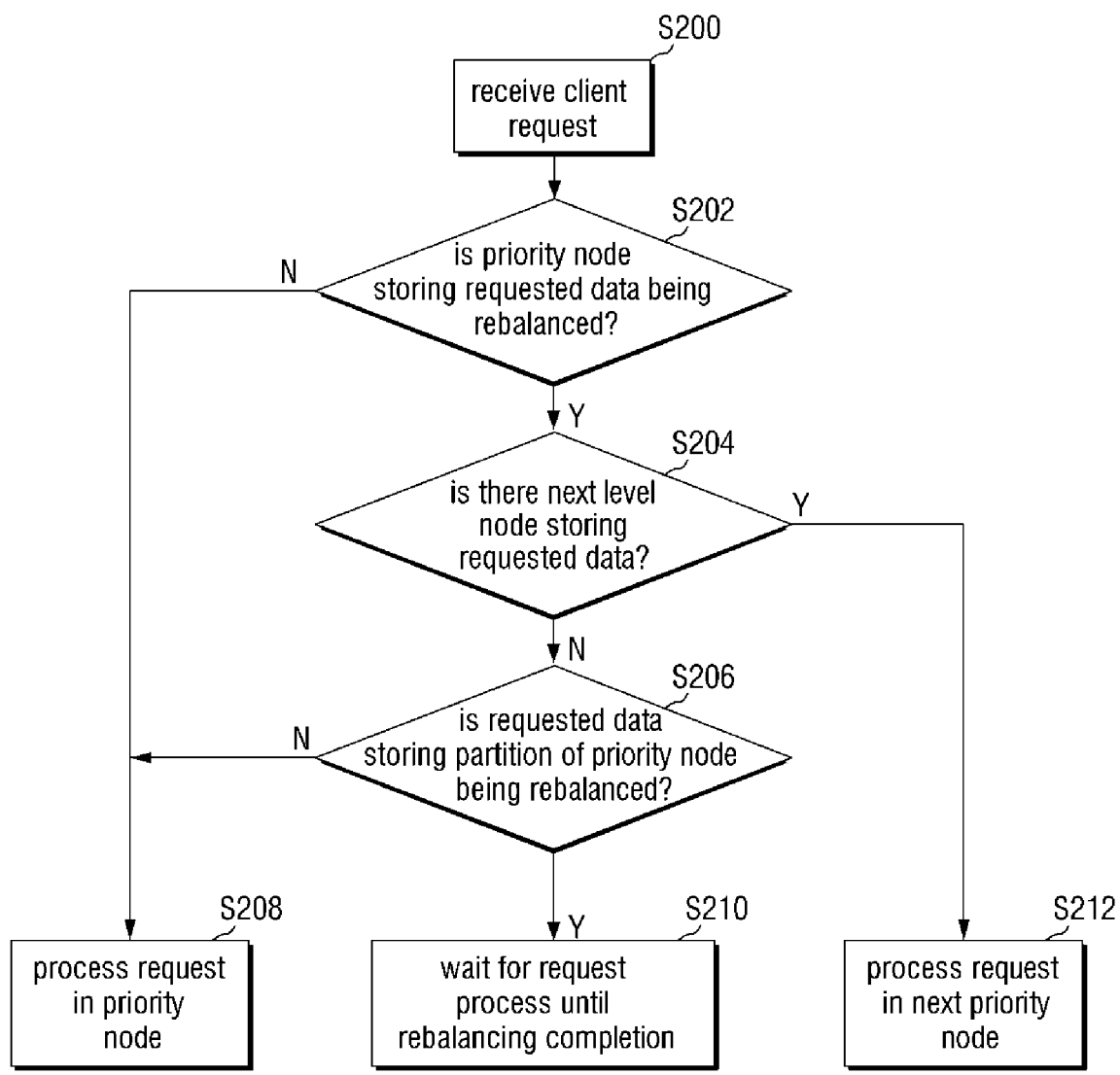
[FIG. 9]

DATABASE REBALANCING METHOD

This application claims priority from Korean Patent Application No. 10-2016-0140885 filed on Oct. 27, 2016 in the Korean Intellectual Property Office, the disclosure of which is incorporated herein by reference in its entirety.

BACKGROUND OF THE INVENTION

1. Field of the Invention

The present invention relates to a database rebalancing method. More specifically, the present invention relates to a method for improving performance of an entire storage system by correcting a bias, when a storage capacity of data or an access to data is biased to a specific database (DB) node, in a storage system made up of a plurality of DB nodes.

2. Description of the Related Art

The database rebalancing refers to a series of processes for moving or replicating the data so that the data storage or the access to data may be equally divided into each DB node, in a storage system made up of a plurality of DB nodes. In many cases, database of NoSQL type is expanded via a scale-out method, but when a new DB node is added for scale out, database rebalancing is performed.

However, while the database rebalancing is performed, since traffic for replicating/moving data in the storage system explosively occurs, the performance of the storage system temporarily deteriorates, which temporarily affects the database itself operating through the storage system and the quality of the application services operating using the database.

SUMMARY OF THE INVENTION

An aspect of the present invention provides a database rebalancing method capable of minimizing degradation of the performance of the entire database system, a DB node on which the method is implemented, and a storage system including the DB nodes.

Another aspect of the present invention provides a database rebalancing method for performing the data rebalancing in different ways depending on the size of data stored in the entire database system, a DB node on which the method is implemented, and a storage system including the DB nodes.

Still another aspect of the present invention provides a DB node in which database rebalancing is performed even in an environment in which only each DB node is connected without another device for managing the database rebalancing, and a storage system including the DB nodes.

The aspects of the present invention are not limited to those mentioned above but another aspect which has not been mentioned can be clearly understood to one of ordinary skill in the art to which the present invention pertains from the following descriptions.

According to an aspect of the inventive concept, there is provided a database rebalancing method performed in a storage system including three or more database (DB) nodes, the method comprises configuring a first node set including two or more DB nodes from among the three or more DB nodes included in the storage system, performing a first partial rebalancing between DB nodes of the first node set, during the first partial rebalancing, performing a first partial rebalancing cover step in which DB nodes excluded from the first node set perform a normal operation, configuring a second node set including two or more DB nodes from among the three or more DB nodes included in the storage system, performing a second partial rebalancing between DB nodes of the second node set, the second partial rebalancing being performed after completion of the first partial rebalancing and during execution of the second partial rebalancing, performing a second partial rebalancing cover step in DB nodes excluded from the second node set perform a normal operation, wherein at least one DB node included in the first node set is not included in the second node set, or at least one DB node included in the second node set is not included in the first node set.

BRIEF DESCRIPTION OF THE DRAWINGS

The above and other aspects and features of the present invention will become more apparent by describing in detail exemplary embodiments thereof with reference to the attached drawings, in which:

FIG. 1 is a diagram of a database-based service system;

FIG. 2 is a first diagram of a storage system according to an embodiment of the present invention;

FIG. 3 is a second diagram of a storage system according to an embodiment of the present invention;

FIGS. 4A to 4D are diagrams for explaining a database rebalancing operation performed when a new DB node is added to the storage system illustrated in FIG. 3;

FIG. 5 is a diagram for explaining an operation of performing the database rebalancing in a state in which the configuration of the DB node is not changed, in the storage system according to the embodiment of the present invention;

FIG. 6 is a diagram for explaining the operation of performing the database rebalancing to supplement a case where one of the DB nodes is in a fail state, in the storage system according to the embodiment of the present invention;

FIG. 7 is a block diagram of a DB node according to an embodiment of the present invention;

FIG. 8 is a flowchart of a database rebalancing method according to an embodiment of the present invention; and FIG. 9 is a flowchart of a method for connecting a service request accepted during the database rebalancing to a DB node, in a database system including a plurality of DB nodes according to an embodiment of the present invention.

DETAILED DESCRIPTION OF THE INVENTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present invention will be described with reference to the drawings.

With reference to FIG. 1, a description will be given of a database-based service system which is an implementation environment of some embodiments of the present invention. The database-based service system may operate on server-client architecture.

An application server 100 is connected to a storage system 200. The storage system 200 includes a plurality of database (DB) nodes 220, 222, and 224. Such a structure is a structure that is easy to perform the scale-out. That is, a DB node may be additionally connected to additionally store data, and if the data size to be stored decreases, a part of the connected DB nodes may be removed to prevent unnecessary resource consumption. As illustrated in FIG. 1, each DB node may be configured, using various types of storage devices such as a hard disk drive (HDD) and a solid state drive (SSD). The storage system 200 may constitute, for example, a database of NoSQL type.

Hereinafter, in the present specification, the DB node refers to a computing device including a storage device, a computing device such as a processor or a storage controller, and a network interface.

The storage system 200 may further include a storage server as well as the DB nodes 220, 222, and 224. The storage server transmits the read and write requests of data received from the application server 100 to the DB nodes 220, 222, and 224. However, the storage system 200 may include only the DB nodes 220, 222, and 224 without another storage server. In this case, each of the DB nodes 220, 222, and 224 may be provided with an adapter module to transmit and receive the data read and write requests and the processing results thereof to and from the application server 100.

The clients 402, 404, and 406 may receive the provision of database-related functions from the storage server and may be connected to an application server 100 that provides the specific service. The application server 100 may be, for example, a web server or a service server. The clients 402, 404, and 406 may be directly connected to the application server 100 without going through the application server 100. In this case, the database client installed in the clients 402, 404, and 406 transmits a query to the storage server.

As illustrated in FIG. 1, the clients 402, 404, and 406 of the database-based service system may be a mobile terminal such as a smartphone or a tablet, and a personal computer such as a desktop computer, and a note PC.

Hereinafter, the configuration and operation of the storage system according to an embodiment of the present invention will be described. Although it will be described below in detail, the database rebasing according to some embodiments of the present invention is performed by sequentially progressing the partial rebalancing, while changing the DB nodes. At this time, at least two DB nodes need to participate in the partial rebalancing. Hereinafter, the term "node set" including the nodes participating in the above partial rebalancing may be used to explain the embodiments of the present invention. Since one DB node needs to execute a normal operation even while the set of nodes including two DB nodes is performing the rebalancing, the storage system according to the present embodiment desirably includes three or more DB nodes.

The fact that the other DB nodes not included in the node set normally perform the operation while the node set performs the partial rebalancing may mean that the data reading and writing service is performed with a response speed within an allowable range. For example, a DB node, which is not included in the node set and stores a copy of data stored in the DB node included in the node set participating in the partial rebalancing execution, may receive a read request of data of the copy from the DB node of the node set and process the read request instead.

In FIG. 2, a storage system 200a including the three DB nodes 226, 228, and 230 is illustrated as an example. In the storage system 200a, there is no separate device for managing the DB node, and the plurality of DB nodes 226, 228, and 230 is directly connected to the application server 100. The application server 100 does not control the database rebalancing operation of the storage system 200a. That is, each DB node interlocks with another DB node to perform its own database rebalancing operation. The storage system 200a may include three or more DB nodes.

In order for each DB node to perform its own database rebalancing operation, each of the DB node 226, 228, and 230 is provided with resource managers 227, 229, and 231. Each of the resource managers 227, 229, and 231 is a series of operations loaded on the memory (not illustrated) of each DB node and performed by a CPU (not illustrated) of each DB node. In an embodiment, the resource managers 227, 229, and 231 may be an embedded application performed on a dedicated processing chip provided in each DB node. The dedicated processing chip is a chip separate from the CPU of each DB node.

The resource managers 227, 229, and 231 include a module that manages the execution of the database rebalancing, a module that aggregates the status information of the DB node and shares it with other DB nodes, and a module that shares the data map of data shared by each DB node. The resource manager aggregates the status information of each DB node and shares it with other DB nodes so that it is possible to make the same determination as to whether all the DB nodes 226, 228, and 230 in the storage system 200a are in the situation requiring the database rebalancing, and the same rebalancing execution plan is prepared.

Each of the resource managers 227, 229, and 231 determines i) that there is a time point at which the database rebalancing is required, ii) how to schedule the database rebalancing, iii) which partition to perform database rebalancing with priority when performing the partial rebalancing on each node. In one embodiment, each resource manager may undergo a synchronization process by sharing the decision results with each other not to make different decisions.

In performing the database rebalancing, the storage system 200a does not rebalance all the DB nodes included in the storage system 200a at the same time. Such a type generates excessive traffic inside the storage system 200a during execution of the rebalancing, and sets all the DB nodes in the busy state, the type makes it impossible for the storage system 200a during execution of the rebalancing to quickly process read and write requests of data from the application server 100.

The storage system 200a sequentially performs the partial rebalancing (described as partial rebalancing to distinguish it from the whole database rebalancing) that involves only a necessary number of DB nodes, while changing the participating DB nodes. For example, a first partial rebalancing between the DB node #1 226 and the DB node #2 228 is performed, and a second partial rebalancing between the DB node #1 226 and the DB node #3 230 is performed, a third partial rebalancing between the DB node #2 228 and the DB node #3 230 may be performed to complete the entire database rebalancing. Since some DB nodes exist in the state of not participating in the partial rebalancing while the entire database rebalancing is being performed, the storage system according to the present embodiment has an effect capable of minimizing the degradation of performance during the database rebalancing.

The storage system 200a is a system that maintains two or more replication factors. The replication factor is a number indicating how many node data is replicated and stored. That is, in a storage system with two replication factors, data is dispersed and stored in two DB nodes. The storage system 200a may keep the replication data in a third DB node in order to maintain two or more replication factors.

The storage system 200a may minimize the performance degradation during database rebalancing, using the replication factor. It is desirable that the storage system 200a does not include a DB node that stores replication data in configuring a set of nodes that execute the partial rebalancing. As a result, even if there is a read and write requests to the DB node that is performing the partial rebalancing, the storage system 200a may immediately process the requests by another DB node storing the copy of the data of the request. A case where the reading request for the data of the DB node #2 228 is received from the application server 100 while the partial rebalancing from the DB node #2 228 to the DB node #3 230 is being performed will be assumed. When a copy of the data is also stored in the DB node #1 226, the resource manager 229 of the DB node #2 228 may send the read request to the resource manager 227 of the DB node #1 226.

An example reflecting the research result as to how many DB nodes simultaneously perform the partial rebalancing will be described. As the number of DB nodes that participate in partial rebalancing at the same time increases, the overall database rebalancing process may be quickly terminated, while the performance degradation during database rebalancing will become more intense. In the opposite case, that is, as the number of DB nodes performing partial rebalancing decreases, it takes more time to process the entire database rebalancing process, but the performance degradation during database rebalancing will be minimized. As already mentioned, the number of DB nodes performing the partial rebalancing is at least two.

In one exemplary embodiment, to minimize performance degradation during database rebalancing, the number of DB nodes performing the partial rebalancing may be fixed to two. The partial rebalancing includes the operation of moving or replicating data from the source side DB node to the target side DB node. As described above, the target side DB node may select any one of the DB nodes except the DB node in which the replication data of the data stored in the source side DB node is stored. At this time, as the number of DB nodes included in the storage system 200a increases, the number of DB nodes that may become the target side DB nodes also increases. Thus, the difficulty level for selecting an appropriate target side DB node becomes lower. In consideration of this point, in another embodiment, the number of DB nodes that execute partial rebalancing may be determined using the number of DB nodes included in the storage system 200a. That is, as the number of DB nodes included in the storage system 200a increases, the number of DB nodes that execute the partial rebalancing may also be increased. In this case, there is an effect capable of reducing the time required for the entire database rebalancing, as compared with the embodiment in which the number of DB nodes that always execute the partial rebalancing is fixed to two.

FIG. 3 is a second diagram of a storage system according to an embodiment of the present invention. FIG. 3 illustrates a storage system 200b including four DB nodes. Unlike FIG. 2, the DB node illustrated in FIG. 3 is divided into one master DB node 232 and three slave DB nodes 234, 236, and 238.

The resource managers 235, 237, and 239 of the slave DB node 234, 236, and 238 share the status information of each of the slave DB nodes 234, 236, and 238 to the resource manager 233 of the master DB node 232. That is, the status information of all the slave DB nodes included in the storage system 200b is shared by the resource manager 233 of the master DB node 232.

The resource manager 233 of the master DB node 232 determines i) that there is a time point at which the database rebalancing is required, ii) how to configure the entire schedule of the database rebalancing, iii) which partition on each node to perform the database rebalancing with priority. The resource manager 233 of the master DB node 232 transmits a command for controlling database rebalance to the resource managers 235, 237, and 239 of each of the slave DB nodes 234, 236, and 238.

Further, the master DB node 232 transmits read and write requests of data received from the application server 100 to each of the slave DB nodes 234, 236, and 238.

Note that although the master DB node 232 performs some of the roles of the controller of the slave DB nodes 234, 236, and 238, the master DB node 232 is also the DB node storing the data.

In some embodiments of the present invention, referring to FIGS. 2 and 3, the description has been given of a case where all the DB nodes included in the storage system 200a are not rebalanced at the same time, and the partial rebasing is sequentially performed, while changing the DB node. Since the storage system is a system that maintains two or more replication factors, the data access request for the DB node that is performing the partial rebalancing may be immediately processed by another DB node storing copies of data according to the data access request, while not performing the partial rebalancing. Also, due to these points, some embodiments of the present invention may also reduce the database performance degradation due to database rebalancing. Hereinafter, some exemplary embodiments for further reducing the performance degradation of the database due to the database rebalancing will be described referring to FIGS. 4A to 4D.

FIGS. 4A to 4D are diagrams for explaining a database rebalancing operation performed when a new DB node is added to the storage system illustrated in FIG. 3.

FIG. 4A illustrates a situation in which one slave DB node 240 is newly connected to the storage system including the master DB node 232 and the three slave DB nodes 234, 236, and 238. This is a situation in which the performance expansion of the storage system is performed by a so-called scale-out. Since the scale-out is performed because traffic is excessively concentrated on the existing DB node of the storage system, it is possible to know that there is a situation in which the database rebalancing is required to maximize the performance improvement effect by the connection of the new slave DB node 240.

That is, it is possible to determine that the master DB node 232 needs to perform the database rebalancing when connecting a new DB node by scale-out.

The database rebalancing of the form illustrated in FIG. 4A may include the movement of some of the data stored in the existing DB node to the new DB node. Of course, data copy for equalizing the load of each DB node may also be performed in parallel in accordance with the rebalancing logic. At this time, by appropriately determining the movement order of data of the existing DB node 232, 234, 236 and 238 to the new DB node 240, the degradation of the database performance due to the database rebalancing may be further reduced. For reference, since the movement of data is to delete data moved from the source side device, it is noted that its meaning differs from the data copy leaving data in the source side device as it is.

The rebalancing priority is given to each DB node included in the storage system according to one embodiment of the present invention. The storage system according to the present embodiment terminates the entire database rebalancing, by performing a series of sequential partial rebalancing. At this time, in order to determine the partial rebalancing order of each DB node, the rebalancing priority is referred to.

The rebalancing priority is determined, using the status information of the DB node which is collected and shared by the resource manager of the DB node. The above-mentioned status information may be, for example, information illustrated in the following Table 1.

TABLE 1

| Name | Description |
| --- | --- |
| read and write RequestCount | Number of read and write requests to DB node (traffic of DB node) |
| slow <op> Count | Occurrence of Slow operation |
| flushQueueLength | Length of Flush queue: as it has been a long time since the flush is not performed, the queue length increases, so long flush queue means that the DB node was in the continuous busy state |
| disk_usage | Storage usage or utilization rate |
| memory_usage | Memory utilization rate |
| cpu_usage | Processor utilization rate |
| hot partition number | As a result of the data stored in the DB node being grouped based on certain criteria, the data is into multiple partitions. At this time, the partition in which load above the reference value exists is referred to as a hot partition.bThe determination criterion of hot partition can be determined, using at least one of the read and writeRequestCountPerPartition, latencyPerPartition and cacheHitPerPartition presented below |

TABLE 1-continued

| Name | Description |
| --- | --- |
| Read and write RequestCountPer Partition | Number of read and write requests for each partition (traffic for each partition) |
| LatencyPerPartition | Reaction time (latency) for each partition |
| CacheHitPerPartition | Cache-hit count for each partition; high cache-hit count means that read frequency for that partition is high |

The rebalancing priority becomes higher as the traffics of the read and write requests for the DB node increase. The rebalancing priority becomes higher as the number of slow operations in which the processing time exceeds the reference value increases. The rebalancing priority becomes higher, as the flush queue length increases. The rebalancing priority becomes higher, as storage usage or utilization rate increases. The rebalancing priority becomes higher, as the utilization rate of processors increases. The rebalancing priority becomes higher, the memory usage and utilization rate increases. The rebalancing priority becomes higher, as the number of the hot partition increases. In short, the rebalancing priority of the DB nodes becomes higher, as many loads are applied to the DB nodes. In calculation of the rebalancing priority, different weights may be given to each factor.

FIG. 4A illustrates an example in which the rebalancing priority is computed for the master DB node 232 and the three slave DB nodes 234, 236, and 238 on the basis of the traffics of the read and write requests for the DB nodes. A DB node in which the most traffic is concentrated among the four conventional DB nodes included in the storage system is a slave #3 DB node 238 in which 350 read and write requests per second are concentrated. Therefore, a traffic reduction action through the data movement is first performed on the slave #3 DB node 238 (first partial rebalancing) to help in reduction of degradation in the database performance due to the database rebalancing. As described several times, the reason is that the slave #3 DB node 238 is a node that can provide an immediately normal serve after the first partial rebalancing operation in which a partial data movement to the new slave node 240 is performed.

In order to facilitate the understanding, FIG. 4A illustrates a configuration in which data moves from the existing slave DB node to the new slave DB node in all the first to fourth partial rebalancing. However, embodiments of the present invention are not limited to a configuration in which, when a new DB node is connected, the existing DB nodes moves data to a new DB node to unconditionally perform the partial rebalancing. It is noted that data movement and data replication between the existing DB nodes may be performed in accordance with the data distribution.

While the first partial rebalancing is performed between the slave #3 DB node 238 and the slave #4 DB node 240, the DB node 232, 234, and 236 which does not participate in the first partial rebalancing are nodes capable of providing normal services.

The second partial rebalancing is performed to the slave #4 DB node 240 from the master DB node 232 in which there are read and write requests of 100 times per second, and at this time, the slave #1 DB node 234, the slave #2 DB node 236, and the slave #3 DB node 238 are nodes capable of providing normal service.

The third partial rebalancing is performed to the slave #4 DB node 236 from the slave #2 DB node 236 in which read and write requests of 75 times per second, and at the same time, the slave #1 DB node 234, the slave #3 DB node 238, and the master DB node 232 are nodes capable of providing normal service.

The fourth partial rebalancing is performed to the slave #4 DB node 240 from the slave #1 DB node 234 in which there are read and write requests of 50 times per second, and at this time, the slave #2 DB node 236, the slave #3 DB node 238, and the master DB node 232 are nodes capable of providing normal service.

FIG. 4A illustrates that all existing nodes transfer the data to the new node, but it is noted that, in the database rebalancing when the new node is connected, all existing nodes do not always transfer the data to the new node. In some cases, according to the database rebalancing policy, only some of the existing nodes transfer the data to the new node.

Hereinafter, referring to FIG. 4B, the description will be given of the operation of quickly processing the read and write requests for the DB node in which the partial rebalancing is being performed by the storage system according to the present embodiment, using the copy stored in the remaining nodes that do not participate in the partial rebalancing. The embodiment illustrated in FIG. 4B is on the premise that a node among the plurality of DB nodes storing data related to the above request which performs a request received from the application server is determined by a 'connection priority'.

The master DB node 232 receives the read and write requests, and searches the DB node on which the data corresponding to the request is stored. Since the storage system manages the copy of data to maintain the replication factor, the above data will be stored in two or more DB nodes. The nodes actually handling the above requests among the multiple DB nodes are determined by the connection priority. Therefore, after forcibly adjusting the connection priority to the DB node in which the partial rebalancing is performed to the lowest level, when the above partial rebalancing is completed, when restoring the connection priority to the original, it is possible to transfer the read and write requests for the DB node in which the partial rebalancing is performed to another DB node in which the partial rebalancing is not performed. FIG. 4B illustrates that the connection priority to the DB node transferring the data to the new node is adjusted to the lowest level.

Until now, in implementing the database rebalancing, some examples have been described which improves performance deterioration during rebalancing by a method in which each DB node sequentially participates. Hereinafter, referring to FIG. 4C, some examples will be described which further improves the performance deterioration during rebalancing, by performing the partial rebalancing only for some partitions when the partial rebalancing is performed on a specific DB node.

As already described with reference to FIGS. 4A and 4B, the first partial rebalancing is performed from the slave #3 DB node 238 to the slave #4 DB node 240. When the nine partitions are included in each DB node, FIG. 4c illustrates that all the nine partitions are empty partitions in the slave #4 DB node 240 which is a new node before performing the first partial rebalancing, all the nine partitions are used partitions in the slave #3 DB node 238 as the existing node, and two partitions among them are hot partitions which are evaluated by the predefined criteria.

The hot partition can be determined, using the following information on each partition among the status information collected by the resource managers of each DB node. (a part of Table 1 is displayed again).

| | |
|---|---|
| Read and writeRequest CountPerPartition | Number of read and write requests for each partition (traffic for each partition) |
| LatencyPerPartition | Reaction time (latency) for each partition |
| CacheHitPerPartition | Cache-hit count for each partition; high cache-hit count means that read frequency for that partition is high |

That is, the partition in which the number of read and write requests is large, the reaction time exceeds the reference value, and a cache-hit count is large may be determined as a hot partition.

There may be various methods when moving a part of the data to the slave #4 DB node 240 from the slave #3 DB node 238 for the first partial rebalancing.

In one exemplary embodiment, at least some of the partitions selected as the hot partition may be moved as they are. FIG. 4C illustrates such an embodiment. According to FIG. 4C, as a result of the first partial rebalancing, among the partitions #2, #4, #6, and #8 which were the hot partitions of the slave #3 DB node 238, all data of #2 and #4 partitions are moved as they are to the # A and # B partitions of the slave #4 DB node 240. That is, as a result of the first partial rebalancing, the number of hot partitions of the slave #3 DB node 238 is reduced from four to two, and the number of hot partitions of the slave #4 DB node 240 increases from zero to two. Thus, it is possible to check that the number of hot partitions between the slave #3 DB node 238 and the slave #4 DB node 240 are the same. In other words, there is an effect in which the number of hot partitions included in each DB node is dispersed by the partial rebalancing. That is, unlike the conventional rebalancing, this embodiment presents a new standard of performing rebalancing of the hot partition. By dispersing the number of hot partitions of each DB node, a better rebalancing effect can be obtained by less data replicating/moving work for rebalancing.

Of course, despite the movement of the hot partition, the data may not be dispersed sufficiently. In such a case, data of partition other than the hot partition may be moved or replicated. However, according to the embodiment of the present invention, the data of the hot partition is moved or replicated in preference to the data rather than the hot partition. In other words, instead of subjecting the hot partition to partial rebalancing, data of other partitions are also subjected to the partial rebalancing, and by first performing the partial rebalancing on the data of the hot partition, data stored in the target DB node as an object of the partial rebalancing may be rebalanced as a whole, but it is possible to quickly solve the phenomenon that the load concentrates on data of the hot partition.

That is, the exemplary embodiment of the present invention referring to FIG. 4C may be widely applied as a database rebalancing method. The database rebalancing method according to the present embodiment may include a step of selecting a hot partition, a step of forming a rebalancing schedule including sequential data movement and data replication so that the number of hot partitions is dispersed for each node.

In another exemplary embodiment, some data may be moved to the target side DB node for all hot partitions. In this case, there is an effect in which the degree of load is relaxed from the existing hot partition to the normal partition by the partial rebalancing.

In still another exemplary embodiment of the present invention, the partial rebalancing may be performed limited to the data of the hot partition. According to the present embodiment, the target affected by the partial rebalancing is limited to a specific partition of the specific DB node, and there is an effect capable of widening the area where the normal service is enabled during execution of the partial rebalancing accordingly. Of course, in order to provide a normal read and write service to the partition rather than the rebalancing target, it is desirable that there are multiple access interfaces in the DB node. The plurality of access interfaces may be hardware interfaces and may be virtual software interfaces. At this time, the first access interface among the plurality of access interfaces may be in charge of the hot partition, and the second access interface among the plurality of access interfaces may be in charge of remaining partitions except the hot partition.

Hereinafter, referring to FIG. 4D, the description will be given of an example in which, when a DB node participating in partial rebalancing receives a request related to data stored by itself, the DB node does not process the request, and transmits the request to another DB node storing the copy of the data.

FIG. 4D also illustrates a system in which a database including the four DB nodes 260, 262, 264, and 266 and an application server 100 are connected. Assume that the application is connected to DB node #1 260 to request read of the data B. Incidentally, partial rebalancing is performed between the DB node #1 260 and the DB node #2 262. Therefore, the DB node #1 260 is in a situation in which the reserve capacity for directly processing the reading of the data B is insufficient. Therefore, the resource manager of the DB node #1 260 transmits a request for reading of the data B to the DB node #4 266 which is the other DB node storing the data B. Next, the DB node #1 260 receives the processing result of the request for reading the data B from the DB node #4 266, and transmits the processing result of the request for reading the data B to the application server 100.

Since the computing load required to process the loading of data B is greater than the computing load required to search for other DB nodes storing data B and transfer the data read request, the embodiment of FIG. 4D is more efficient in terms of processing time for data read request.

Hereinafter, with reference to FIG. 5, the operation of performing database rebalancing in a state in which the configuration of the DB node is not changed, by the storage system according to the embodiment of the present invention will described. As illustrated in FIG. 5, even when database rebalancing is performed in the state in which the configuration of the DB node is not changed, the partial rebalancing is sequentially performed for different DB nodes. When performing the partial balancing on each node, it is possible to perform rebalancing mainly on hot partition data, without performing rebalancing on the entire data. Data rebalancing in such a case may be performed in a direction that disperses the number of hot partitions included in each DB node.

First, when examining the rebalancing priority of each DB node, the order of DB node #1 242, DB node #2 244, DB node #3 246, and DB node #4 248 will be set in consideration of the number of hot partitions. The first partial rebalancing may be scheduled by transferring a part of the hot partitions of the DB node #1 242 to the DB node #3 246 of lower priority. At this time, since there is a need to maintain the replication factor, it is necessary to move the data that is not stored in DB node #3 246. As a result, FIG. 5 illustrates that the five hot partitions can be transferred to the DB node #3 246. As a result of the first partial rebalancing, the number of hot partitions of DB node #1 242 decreases from 20 to 15, and the number of hot partitions of DB node #3 246 increases from 3 to 8. Despite the result of the first partial rebalancing, since the hot partitions of the DB node #1 242 are not yet sufficiently dispersed, the next partial rebalancing is performed.

The second partial rebalancing may be scheduled by moving a part of the remaining hot partitions of DB node #1 242 to DB node #4 248 with lower priority. As with the first partial rebalancing, it is necessary to maintain the replication factor, there is a need to transfer the data that is not stored in DB node #4 246. As a result, FIG. 5 illustrates that seven hot partitions may be transferred to the DB node #4 248. As a result of the second partial rebalancing, the number of hot partitions of the DB node #1 242 decreases from 15 to 8, and the number of hot partitions of the DB node #4 246 increases from 1 to 8. As a result of the second partial rebalancing, since the number of hot partitions of the entire DB node 242, 244, 246, and 248 has been adjusted to be the same, the database rebalancing is terminated.

Hereinafter, referring to FIG. 6, in a storage system according to an embodiment of the present invention, when any one of the DB nodes is in the fail state, an operation of performing database rebalancing for complementing this state will be described. According to FIG. 6, the DB node #8 256 is in the fail state. The database rebalancing needs to be performed to disperse the number of hot partitions of each DB node, while maintaining the replication factor. In the following description with reference to FIG. 6, the replication factor of the storage system including the DB nodes #5 to #9 (250, 252, 254, 256, and 258) is assumed to be 2.

First, when examining the rebalancing priority of each DB node, the order of DB node #9 258, DB node #5 250, DB node #7 254, and DB node #6 252 will be set in consideration of the number of hot partition.

In the first partial rebalancing, two of the hot partitions of DB node #9 258 are moved to DB node #7 254 with a lower rebalancing priority. It is understood that the data of the moved hot partition can be moved to the DB node #7 254 because the data is not stored in the DB node #7 254 and does not influence the replication factor. Also, let's assume that copies of two among the hot partitions of DB node #8 256 which are in the fail state are also stored in DB node #9. Then, in order to maintain the replication factor, the partitions of the two copies stored in DB node #9 could be replicated to DB node #7. As a result of the first partial rebalancing, the hot partition of DB node #9 258 decreases from 12 to 10, and the hot partition of DB node #7 254 increases from 2 to 6.

Next, the second partial rebalancing is performed from DB node #9 258 to DB node #6 252. At this time, the reason why the source side DB node of the second partial rebalancing is still the DB node #9 258 is that, despite the first partial rebalancing, the number of hot partitions of the DB node #9 258 is not still reduced from that of DB node #5 250 of the next rank. Two among the hot partitions of the DB node #9 258 are moved to the DB node #6 252 with a lower rebalancing priority. It is understood that data of the moved hot partition can be moved to the DB node #6 252 because the data is not stored in the DB node #6 252 and does not influence the replication factor. Also, let's assume that copies of two among the hot partitions of DB node #8 256 which are in the fail state are also stored in DB node #9. Then, in order to maintain the replication factor, the partitions of the two copies stored in DB node #9 could be replicated to DB node #6 252. As a result of the second partial rebalancing, the hot partition of DB node #9 258 decreases from 10 to 8, and the hot partition of DB node #6 252 increases from 2 to 6.

Next, the third partial rebalancing is performed from the DB node #5 250 to the DB node #7 254. One of the hot partitions of DB node #5 250 is moved to DB node #7 254. It is understood that the data of the moved hot partition can move to the DB node #7 254 because the data is not stored in the DB node #7 254 and does not influence the replication factor. Let's also assume that a copy of one of the hot partitions of DB node #8 256 which is in the fail state is also stored in DB node #5 250. Then, in order to maintain the replication factor, the partition of the one copy stored in DB node #5 250 could be replicated to DB node #7 254. As a result of the third partial rebalancing, the hot partition of DB node #5 258 decreases from 10 to 9, and the hot partition of DB node #7 254 increases from 6 to 8.

Next, the fourth partial rebalancing is performed from the DB node #5 250 to the DB node #6 252. At this time, the reason why the source side DB node of the fourth partial rebalancing is still DB node #5 250 is that, despite the third partial rebalancing, the number of hot partitions of DB node #5 250 is not reduced from that of the DB node #7 254 of the next ranking. One of the hot partitions of the DB node #5 250 is moved to the DB node #6 252 having the lower rebalancing priority. It is understood that the data of the moved hot partition can be moved to the DB node #6 252 because the data is not stored in the DB node #6 252 and does not influence on the replication factor. Let's also assume that the copy of one of the hot partitions of DB node #8 256 which is in the fail state is also stored in the DB node #5 250. Then, in order to maintain the replication factor, the one copy partition stored in DB node #5 250 could be replicated to the DB node #6 252. As a result of the fourth partial rebalancing, the hot partition of DB node #5 250 decreases from 9 to 8, and the hot partition of DB node #6 252 increases from 6 to 8.

As a result of the execution of the fourth partial rebalancing, since all the DB nodes #5, #6, #7, and #9 (250, 252, 254, and 258) have eight hot partitions, the database rebalancing is terminated.

Hereinafter, referring to FIG. 7, the configuration and operation of the DB node according to an embodiment of the present invention will be described. As illustrated in FIG. 7, the DB node 500 according to this embodiment includes a storage unit 502 as a hardware storage that stores data, a resource manager 504, and a network interface 506 which performs transmission and reception of data to and from other DB nodes and a application server.

As illustrated in FIG. 7, the resource manager 504 includes a rebalancing scheduling unit 548, other node status collecting unit 540, a node detecting unit 542, a node health check unit 544, and other node control unit 546. The resource manager 504 is a series of operations loaded on the memory (not illustrated) of the DB node 500 and performed by the CPU (not illustrated) of the DB node 500. In an embodiment, the resource manager 504 may be made up of a dedicated processing chip that implements the embedded program and is separate from the CPU.

The other node status collecting unit 540 collects the status information from other DB nodes connected via the network interface 506. As an example of the above status information, Table 1 has already been presented. The node detecting unit 542 detects that a new node is connected to the storage system. The node health check unit 544 checks the state of another DB node connected to the storage system, for example, by checking whether or not the health check message is normally received from another DB node connected to the storage system. The other node control unit 546 generates a command for performing the schedule in accordance with the database rebalancing schedule provided from the rebalancing scheduling unit 548, and transmits the generated command to the other DB node 500 through the network interface 506.

The rebalancing scheduling unit 548 comprehensively determines the status information of the other nodes provided from the other node status collecting unit 540, information on whether or not the connection of the new node provided by the node detecting unit 542 is made, the health information of the other nodes provided from the node health check unit 544, and the data map 520 indicating the storage status of each DB node stored in the storage unit 502 to perform the rebalancing scheduling.

The rebalancing scheduling unit 548 determines i) whether there is a time point at which the database rebalancing is required, ii) how order to perform the database rebalancing, iii) which partition on each node to perform database rebalancing.

The rebalancing scheduling unit 548 assigns a rebalancing priority to each DB node included in the storage system. The rebalancing scheduling unit 548 generates the entire database rebalancing schedule configured with a series of continuous partial rebalancing. At this time, in order to determine the partial rebalancing order of each DB node, the rebalancing priority is referred to. The rebalancing priority of the DB node becomes higher as the load on the DB node increases. The rebalancing scheduling unit 548 determines that a partition with a large number of read and write requests, a reaction time exceeding the reference value, and a large cache-hit count as a hot partition, and only the hot partition may be a target of rebalancing.

Hereinafter, a database rebalancing method according to an embodiment of the present invention will be described with reference to FIG. 8. The database rebalancing method according to the present embodiment may be performed by the storage system described with reference to FIGS. 2 to 6. It is noted that the database rebalancing method according to the present embodiment may reflect the operation of the storage system according to some embodiments described with reference to FIGS. 2 to 6.

First, it is determined whether or not there is a situation in which database rebalancing is required (S100). For example, a case where a new DB node is connected, a case where there is a node that is in the FAIL status among the DB nodes included in the storage system, and a case where the load is concentrated to a specific DB node over reference values are cases where the database rebalancing is required.

The database rebalancing method according to some exemplary embodiments of the present invention may be performed only when the size of the data stored in the storage system exceeds the reference value (S101). If the size of the data stored in the storage system does not reach the reference value, database rebalancing of the existing method is performed (S102).

In an exemplary embodiment, the database rebalancing method according to some embodiments of the present invention may be performed only when the storage system maintains two or more replication factors. If the storage system does not maintain two or more replication factors, database rebalancing of the existing method is performed.

Next, a target node for performing database rebalancing is selected (S103). In some cases, the database rebalancing may be performed on only some of the DB nodes included in the storage system, and database rebalancing may be performed on all the DB nodes included in the storage system. Also, if the database rebalancing is performed on a specific node, a hot partition to preferentially execute database rebalancing among the partitions in the nodes is selected (S104).

Next, partial rebalancing between two or more DB nodes is sequentially performed while changing the DB nodes (S106). At this time, the order of performing the partial rebalancing is determined by reflecting the rebalancing priority, and as a result, the partial rebalancing of the DB nodes on which the load concentrates is preferentially performed.

Also, while performing the partial rebalancing, the connection priority to the DB node that is performing the partial rebalancing is adjusted to be temporarily lower. As a result, while a specific DB node is performing the partial rebalancing, when a request to read and write data of the DB node is received, the above request is processed immediately through other DB nodes which store the copy of the data and do not perform the partial rebalancing. In short, during the above partial rebalancing, the service request of the DB node included in the node set as the partial rebalancing target is transmitted to the DB node having the copy data of the data stored in the DB node to which the access is requested, among the remaining DB nodes except the DB nodes include in the first node set.

As described above, even in the partial rebalancing of a specific DB node, the partial rebalancing is also performed sequentially for each partition, and the partial rebalancing is not performed on entire partitions in the DB node at the same time. Therefore, when the rebalancing of a specific partition is completed (S108), the next partition is rebalanced (S110). When the rebalancing of all rebalancing target partitions is completed, the partial rebalancing on the next DB node is performed (S112, S114).

In short, some partitions among the hot partitions may be moved between the DB nodes included in the first node set so that the number of hot partitions of each DB node included in the storage system is standardized, or some of the data of the hot partition may be moved between the DB nodes included in the first node set so that the number of entire hot partitions of the storage system decreases.

Hereinafter, in a database system constituted by a plurality of DB nodes according to an embodiment of the present invention, a method for connecting a service request accepted during database rebalancing to a DB node will be described with reference to FIG. 9.

When a request related to read and write of data from the client is received (S200), among the DB nodes storing the requested data, it is determined whether the DB node having the highest connection priority is being currently subjected to partial rebalancing (S202). Otherwise, the DB node may immediately process the request (S208).

If the DB node is performing the current partial rebalancing, it is determined whether there is a DB node with next highest connection priority among the DB nodes storing the requested data (S204). If such a DB node exists, the request is processed at the node (S212).

If there is no DB node with the next highest connection priority among the DB nodes storing the requested data, the requested data is stored only in the DB node currently subjected to partial rebalancing. Then, it is determined whether the partition in which the requested data is stored is currently subjected to partial rebalancing (S206). According to some embodiments of the present invention, even if data rebalancing of a specific DB node is performed, instead of performing data rebalancing simultaneously on all partitions of the DB node, the data rebalancing is performed sequentially for each partition. Thus, if the partition in which the requested data is stored is not currently subjected to partial rebalancing, the above request can be directly processed via another access interface which is not in charge of the partition on which the partial rebalancing is currently performed among the plurality of access interfaces included in the DB node (S208). If the partition in which the requested data is stored is currently subjected to partial rebalancing, processing of the request should be waited until the partial rebalancing of the partition is completed (S210).

The methods according to the embodiment of the present invention described above can be performed by execution of a computer program implemented as computer-readable code. The computer program can be transferred to a second computing device from a first computing device via a network such as Internet and installed on the second computing device, and can be used in the second computing devices. The first computing device and the second computing device include both a server device, a physical server belonging to a server pool for a cloud service, a fixed computing device such as a desktop PC or the like.

The above computer program may be stored on a recording medium such as DVD-ROM or flash memory device.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

The concepts of the invention described above with reference to FIGS. 3 to 7 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A database rebalancing method performed in a storage system including three or more database (DB) nodes, the method comprising:

determining a rebalancing priority of each DB node of the three or more DB nodes based on degree of load applied to the each DB node, the rebalancing priority of the each DB node increasing as load applied to the each DB node increases;

identifying a first DB node having a highest rebalancing priority and a second DB node having a second highest rebalancing priority;

configuring a first node set including the first DB node and at least one DB nodes among the three or more DB nodes included in the storage system;

performing a first partial rebalancing, by moving or copying data, between DB nodes of the first node set;

during the first partial rebalancing, performing a first partial rebalancing cover step in which DB nodes excluded from the first node set continues to process service request;

configuring a second node set including the second DB node and at least one DB nodes among the three or more DB nodes included in the storage system, the second DB node excluding the first DB node;

performing a second partial rebalancing, by moving or copying data, between DB nodes of the second node set, the second partial rebalancing being performed after completion of the first partial rebalancing; and during execution of the second partial rebalancing, performing a second partial rebalancing cover step in DB nodes excluded from the second node set continues to process a service request.

2. The database rebalancing method of claim 1, wherein the first partial rebalancing cover step comprises:

a service request transferring step in which a third DB node storing target data among the DB nodes of the first node set receives a service request related to the target data, and transmits the service request to a fourth DB node having replication data of the target data, during the execution of the first partial rebalancing, wherein the storage system keeps the replication data in one or more DB nodes in order to maintain two or more replication factors, and wherein the fourth DB node is not included in the first node set.

3. The database rebalancing method of claim 2, wherein the service request transferring step comprises:

processing the service request and transferring a result to the third DB node by the fourth DB node, and transmitting, by the third DB node, a processing result of the received service request as a response to the service request.

4. The database rebalancing method of claim 1, wherein the degree of load applied to the each DB node is determined based on factors including a number of read and write requests traffic to the each DB node, a number of slow operation within the each DB node, and a number of a length of a flush queue within the each DB node, wherein the rebalancing priority of the each DB node increases as the number of read and write requests traffic increases, the rebalancing priority increases is as the number of slow operations increases, and the rebalancing priority increases as a length of the flush queue increases.

5. The database rebalancing method of claim 1, wherein the performing the first partial rebalancing comprises performing rebalancing of a first hot partition selected based on load concentration from among partitions of the DB nodes of the first node set, and wherein performing the second partial rebalancing comprises performing rebalancing of a second hot partition selected based on load concentration from among partitions the DB nodes of the second node set.

6. The database rebalancing method of claim 5, wherein the performing of the rebalancing of the first hot partition comprises moving partitions from the first hot partition between the DB nodes of the first node set so that a number of hot partitions of each DB node included in the storage system is equalized, and performing rebalancing of the second hot partition comprises moving partitions from the second hot partition between the DB nodes of the second node set so that the number of the hot partitions of each DB node included in the storage system is equalized.

7. The database rebalancing method of claim 5, wherein the performing rebalancing of the first hot partition comprises:

moving data of the first hot partition between the DB nodes of the first node set so that a number of hot partitions of the storage system decreases, and performing rebalancing of the second hot partition comprises moving data of the second hot partition between the DB nodes of the second node set so that the number of the hot partitions of the storage system decreases.

8. The database rebalancing method of claim 5, wherein the first partial rebalancing cover step comprises:

in response to a service request being related to data stored only in the DB nodes of the first node set during the execution of the first partial rebalancing, when data related to the service request is not stored the first hot partition, immediately processing the service request during execution of the first partial rebalancing.

9. The database rebalancing method of claim 8, wherein the data related to the service request is stored in a DB node provided with a plurality of access interfaces in charge of a plurality of partitions, and wherein a first access interface among the plurality of access interfaces is in charge of the first hot partition, and a second access interface among the plurality of access interfaces is in charge of partitions other than the first hot partition.

10. The database rebalancing method of claim 1, wherein the configuring the first node set, the performing of the first partial rebalancing, the performing of the first partial rebalancing cover step, the configuring the second node set, the performing of the second partial rebalancing, and performing of the second partial rebalancing cover step are performed only if a data size of the storage system is equal to or greater than a reference value.

11. The database rebalancing method of claim 10, wherein the configuring the first node set, the performing of the first partial rebalancing, the performing of the first partial rebalancing cover step, the configuring of the second node set, the performing of the second partial rebalancing, and the performing of the second partial rebalancing cover step are performed only if the data size of the storage system is equal to or larger than a reference value, and if a replication factor of the storage system is two or more.

12. The database rebalancing method of claim 1, further comprising:

connecting a new DB node to scale-out to the storage system, determining a rebalancing priority of each DB node of the three or more DB nodes and and the new DB node based on degree of load, the rebalancing priority increasing as load increases, and wherein the first node set and the second node set both include the new DB node.

13. The database rebalancing method of claim 1, wherein, when there is no change in the DB node included in the storage system, the first node set includes a third DB node, the third DB node receiving data from the first DB node, and wherein the second node set includes a fourth DB node, the fourth DB node receiving data from the second DB node.

* * * * *